United States Patent
Zhao et al.

(10) Patent No.: US 12,245,047 B2
(45) Date of Patent: Mar. 4, 2025

(54) ELECTRONIC DEVICE AND METHOD FOR WIRELESS COMMUNICATION, AND COMPUTER READABLE STORAGE MEDIUM FOR DETERMINING AND USING A SPECTRUM SHARING MODE

(71) Applicant: Sony Group Corporation, Tokyo (JP)

(72) Inventors: Youping Zhao, Beijing (CN); Mengting Lin, Beijing (CN); Chen Sun, Beijing (CN); Zhong Tian, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 303 days.

(21) Appl. No.: 17/796,678

(22) PCT Filed: Mar. 15, 2021

(86) PCT No.: PCT/CN2021/080699
§ 371 (c)(1),
(2) Date: Aug. 1, 2022

(87) PCT Pub. No.: WO2021/185194
PCT Pub. Date: Sep. 23, 2021

(65) Prior Publication Data
US 2023/0067463 A1 Mar. 2, 2023

(30) Foreign Application Priority Data
Mar. 20, 2020 (CN) .......................... 202010202089.5

(51) Int. Cl.
H04W 72/04 (2023.01)
H04W 16/04 (2009.01)
(Continued)

(52) U.S. Cl.
CPC .......... *H04W 16/14* (2013.01); *H04W 16/04* (2013.01); *H04W 72/0453* (2013.01); *H04W 72/543* (2023.01)

(58) Field of Classification Search
CPC . H04W 16/14; H04W 16/04; H04W 72/0453; H04W 72/543; G06F 16/29
(Continued)

(56) References Cited

U.S. PATENT DOCUMENTS

2017/0311173 A1  10/2017  Zhou
2021/0204300 A1* 7/2021  Hu ..................... H04B 7/18513
2021/0211887 A1* 7/2021  Jones .................... H04W 16/10

FOREIGN PATENT DOCUMENTS

CN    102186177 A    9/2011
CN    104519495 A    4/2015
(Continued)

OTHER PUBLICATIONS

Saleem et al. (Spectrum sharing optimization with Qos guarantee in cognitive radio networks,2013) (Year: 2013).*
(Continued)

*Primary Examiner* — Maharishi V Khirodhar
(74) *Attorney, Agent, or Firm* — XSENSUS LLP

(57) ABSTRACT

The present invention provides an electronic device and method for wireless communication, and a computer readable storage medium. The electronic device comprises: a processing circuit configured to determine, on the basis of service requirements of each of at least one user equipment, a spectrum sharing mode suitable for the user equipment, and determine, on the basis of the spectrum sharing mode of each user equipment, a spectrum sharing scheme of each user equipment.

19 Claims, 12 Drawing Sheets

(51) Int. Cl.
    *H04W 16/14*      (2009.01)
    *H04W 72/0453*    (2023.01)
    *H04W 72/543*     (2023.01)
    *H04W 76/00*      (2018.01)
    *H04W 88/08*      (2009.01)

(58) Field of Classification Search
    USPC .......................................................... 370/329
    See application file for complete search history.

(56) References Cited

FOREIGN PATENT DOCUMENTS

| | | |
|---|---|---|
| CN | 104540178 A | 4/2015 |
| CN | 106332088 A | 1/2017 |
| CN | 107431929 A | 12/2017 |
| WO | 2017/041395 A1 | 3/2017 |

OTHER PUBLICATIONS

Cristina ("How Should I Slice My Network? A Multi-Service Empirical Evaluation of Resource Sharing Efficiency", 2018). (Year: 2018).*

Kevin et al. (Dynamic Spectrum Access Enabled DoD net centric Spectrum Management, 2007). (Year: 2007).*

International Search Report and Written Opinion mailed on May 26, 2021, received for PCT Application PCT/CN2021/080699, filed on Mar. 15, 2021, 9 pages including English Translation.

* cited by examiner

| Parameters and Modes / Service types | Latency requirement | Channel requirement | Emitting power requirement | Transmission rate requirement | Spectrum sharing mode |
|---|---|---|---|---|---|
| Low-latency requirement service | <1ms | 1~2 | 12dBm~18dBm | <1Mbps | Vertical |
| General data service | >10ms | 1~2 | 18dBm~22dBm | 1~100Mbps | Horizontal |
| High data transmission rate service | 1ms~10ms | 3~5 | 22dBm~28dBm | >100Mbps | Tilt |

Figure 3

ELECTRONIC DEVICE AND METHOD FOR WIRELESS COMMUNICATION, AND COMPUTER READABLE STORAGE MEDIUM FOR DETERMINING AND USING A SPECTRUM SHARING MODE

CROSS-REFERENCE TO RELATED APPLICATIONS

The present application is based on PCT filing PCT/CN2021/080699, filed Mar. 15, 2021, which claims priority level to Chinese Patent Application No. 202010202089.5, titled "ELECTRONIC DEVICE AND METHOD FOR WIRELESS COMMUNICATION, AND COMPUTER READABLE STORAGE MEDIUM", filed on Mar. 20, 2020 with the China National Intellectual Property Administration (CNIPA), the entire contents of each are incorporated herein by reference in its entirety.

FIELD

The present disclosure relates to the technical field of wireless communications, and in particular to spectrum management technology. More particularly, the present disclosure relates to an electronic apparatus and a method for wireless communications, and a computer-readable storage medium.

BACKGROUND

With the continuous development of wireless communication technology, human beings gradually realize the importance of making full use of limited spectrum resources while enjoying the convenience brought by wireless communications to the life. The arrival of the 5G era has brought new challenges to spectrum management.

Applications in the 5G network may be classified into three categories according to demand, namely, Massive Machine Type Communication (mMTC), Ultra-Reliable Low-Latency Communication (uRLLC) and Enhanced Mobile Broadband (eMBB). From these three main application scenarios, 5G can provide various services for various communication devices. This greatly promotes the development of various industries. The emergence of massive communication devices also brings new challenges to the spectrum management. On the one hand, massive connections exacerbate the shortage of spectrum resources, so that more effective spectrum resource management becomes urgent. On the other hand, massive connections result in massive amount of user data, so that how to deal with the massive amounts of user data and perform the spectrum management also becomes a big problem.

5G and future wireless communication networks may inject new blood into various vertical industries (such as entertainment, healthcare, and industrial Internet of Things). In this process, consideration of demand for diverse services naturally becomes another key point in the spectrum management.

All in all, the spectrum management for future wireless communication networks faces three major challenges, namely, (1) efficient computing and processing capabilities for the massive amount of user data; (2) rapidly increasing demand for spectrum resources; (3) differentiated spectrum management for diverse services.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes: processing circuitry, configured to: determine, based on a service requirement of each of at least one user equipment, a spectrum sharing mode suitable for the user equipment; and determine, based on the spectrum sharing mode for respective user equipment, a spectrum sharing scheme for the respective user equipment.

A method for wireless communications is provided according to another aspect of the present disclosure. The method includes: determining, based on a service requirement of each of at least one user equipment, a spectrum sharing mode suitable for the user equipment; and determining, based on the spectrum sharing mode for respective user equipment, a spectrum sharing scheme for the respective user equipment.

An environmental database is provided according to an aspect of the present disclosure. The environmental database includes processing circuitry and a storage. The storage is configured to store a correspondence relationship between a spectrum sharing mode of user equipment and a parameter required for determining a spectrum sharing scheme for the user equipment, where the spectrum sharing mode of the user equipment is determined based on a service requirement of the user equipment. The processing circuitry is configured to: acquire the spectrum sharing mode of the user equipment; and determine, based on the spectrum sharing mode, the required parameter according to the correspondence relationship.

A method for an environmental database is provided according to another aspect of the present disclosure. The method includes: storing a correspondence relationship between a spectrum sharing mode of user equipment and a parameter required for determining a spectrum sharing scheme for the user equipment, where the spectrum sharing mode of the UE is determined based on a service requirement of the UE; acquiring the spectrum sharing mode of the user equipment; and determining, based on the spectrum sharing mode, the required parameter according to the stored correspondence relationship.

According to the electronic apparatus and the method in the above aspects of the present disclosure, respective user equipment is provided with different spectrum sharing modes based on service requirements of the respective user equipment, and a spectrum sharing scheme of the respective user equipment is determined based on the spectrum sharing mode of the respective user equipment. In this way, efficient spectrum sharing can be achieved among user equipment with diverse service requirements.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent from the following detailed description of preferred embodiments of the present disclosure in conjunction with the accompanying drawings.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 3 shows an example of a correspondence relationship between a service type of user equipment and a parameter as well as a spectrum sharing mode of the user equipment;

DETAILED DESCRIPTION

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As mentioned above, service requirements vary from user equipment to user equipment. Therefore, it is expected to provide a spectrum management scheme that takes into account the diverse service requirements, so that the user equipment with different service requirements may share the spectrum resources with higher efficiency.

Figure 1:
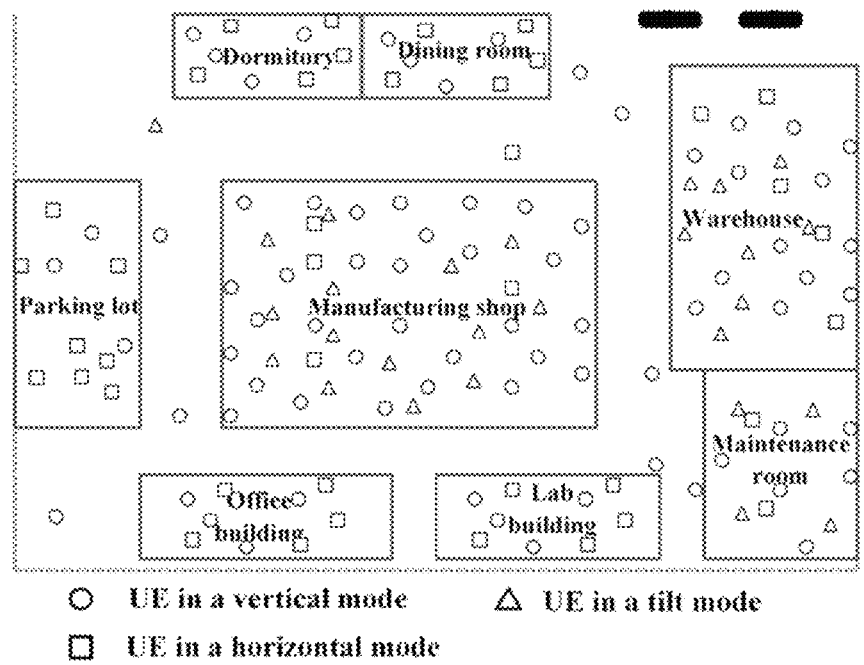
FIG. 1 shows an example of an application scenario involving diverse service requirements.

In order to facilitate understanding, FIG. 1 shows an example of an application scenario with diverse service requirements. FIG. 1 shows a smart factory with diverse service requirements, which may include the following services: a service requiring low-latency, such as industrial control; (2) a general data service, such as email; (3) a service with high throughput volume, such as real-time video monitoring. In this scenario, a large number of communication devices and diverse service requirements are included, and thus an efficient spectrum management method is required to realize spectrum sharing among these communication devices. It should be understood that FIG. 1 only shows an example of a scenario, and is not limitative. Instead, this embodiment may be applied to various scenarios with diverse service requirements, such as smart medical care, and smart agriculture.

Figure 2:
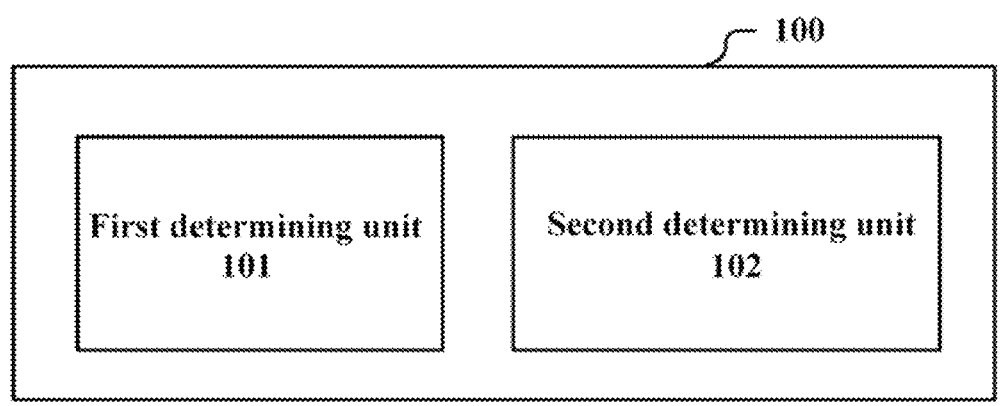
FIG. 2 is a block diagram showing functional modules of an electronic apparatus for wireless communications according to an embodiment of the present disclosure.

FIG. 2 shows a block diagram of functional modules of an electronic apparatus 100 for wireless communications according to an embodiment of the present disclosure. As shown in FIG. 2, the electronic apparatus 100 includes a first determining unit 101 and a second determining unit 102. The first determining unit 101 is configured to determine, based on a service requirement of each of at least one user equipment, a spectrum sharing mode suitable for the user equipment. The second determining unit 102 is configured to determine, based on the spectrum sharing mode for respective user equipment, a spectrum sharing scheme for the respective user equipment.

The electronic apparatus 100 may be arranged, for example, on the side of a central management apparatus or the side of a spectrum management apparatus, or may be communicatively connected to the central management apparatus or the spectrum management apparatus. In addition, the electronic apparatus 100 may also be arranged on the side of a core network. The central management apparatus or spectrum management apparatus described herein may be implemented as various functional entities, such as a Spectrum Access System (SAS) or a Coexistence Manager (CxM), and a Group Spectrum Coordinator (GSC).

It should also be noted that the electronic apparatus 100 may be implemented at the chip level, or may be implemented at the device level. For example, the electronic apparatus 100 may operate as the central management apparatus or the spectrum management apparatus, and may also include external devices such as a memory, and a transceiver (not shown in the drawings). The memory may be configured to store programs to be executed by the central management apparatus or the spectrum management apparatus to realize various functions and related data information. The transceiver may include one or more communication interfaces to support communication with various devices (for example, a base station, other central management apparatus or spectrum management apparatus, user equipment and the like), and the implementation of the transceiver is not specifically limited herein.

The service requirements may for example include one or more of the following: a requirement of Quality of Service (QoS) or Quality of Experience (QoE), a requirement of latency, and a requirement of data transmission rate. For example, a service that requires high communication reliability has the high requirement of QoS or QoE, a service that requires high real-time performance has the low requirement of latency, a service that requires large amounts of data has the high requirement of data transmission rate and the like.

In an example, the first determining unit 101 may be configured to determine the spectrum sharing mode of the UE (hereinafter also simply referred to as a mode) based on a 24) pre-trained model of correspondence relationship. The model of correspondence relationship represents the correspondence relationship between a parameter of the UE and the spectrum sharing mode of the UE, and the parameter of the UE is based on at least the service requirement of the UE. In other words, the model of correspondence relationship allocates a spectrum sharing mode to the UE depending on the service requirement of the UE, so that the first determining unit 101 determines the spectrum sharing mode suitable for the UE using the model of correspondence relationship.

The parameter of the user equipment may be represented, for example, by a feature vector F:

$$F=(L,P,D,T) \quad (1)$$

where, L represents a location of the UE, P represents emitting power of the UE, D represents a channel requirement of a service of the UE, and T represents the requirement of latency of the service of the UE. Equation (1) is only an example of the feature vector. In practice, an item may be added to the feature vector, an item in the feature vector may be removed or modified, depending on service requirements, which is not restrictive.

For example, the spectrum sharing mode may include: a low-latency service requirement mode (also known as a vertical mode), a high data transmission rate requirement mode (also known as a tilt mode), and a general data service requirement mode (also known as a horizontal mode). It should be understood that this is not restrictive, and these spectrum sharing modes may be simplified or expanded depending on service requirements. Referring back to FIG. 1, it can be seen that UEs suitable for different spectrum sharing modes are distributed in the application scenario.

FIG. 3 shows an example of a correspondence relationship between a service type of the UE and a parameter as well as a spectrum sharing mode of the UE. It can be seen that when the UE has different types of service, the parameter requirement of the UE falls within different ranges, and is suitable for different spectrum sharing modes.

The model of correspondence relationship described above may be obtained by pre-training. For example, a machine learning algorithm may be used to obtain the model of correspondence relationship. A dataset of a parameter of the UE and a spectrum sharing mode corresponding to the parameter of the UE is generated or obtained first. Next, the dataset is then used as the training data for the machine learning algorithm to obtain the model of correspondence relationship between the parameter and the spectrum sharing mode of the UE.

As an example of a machine learning algorithm, a multi-class supervised learning algorithm, such as a random forest algorithm, a K-neighbor algorithm and a naive Bayes algorithm, may be used.

Figure 4:
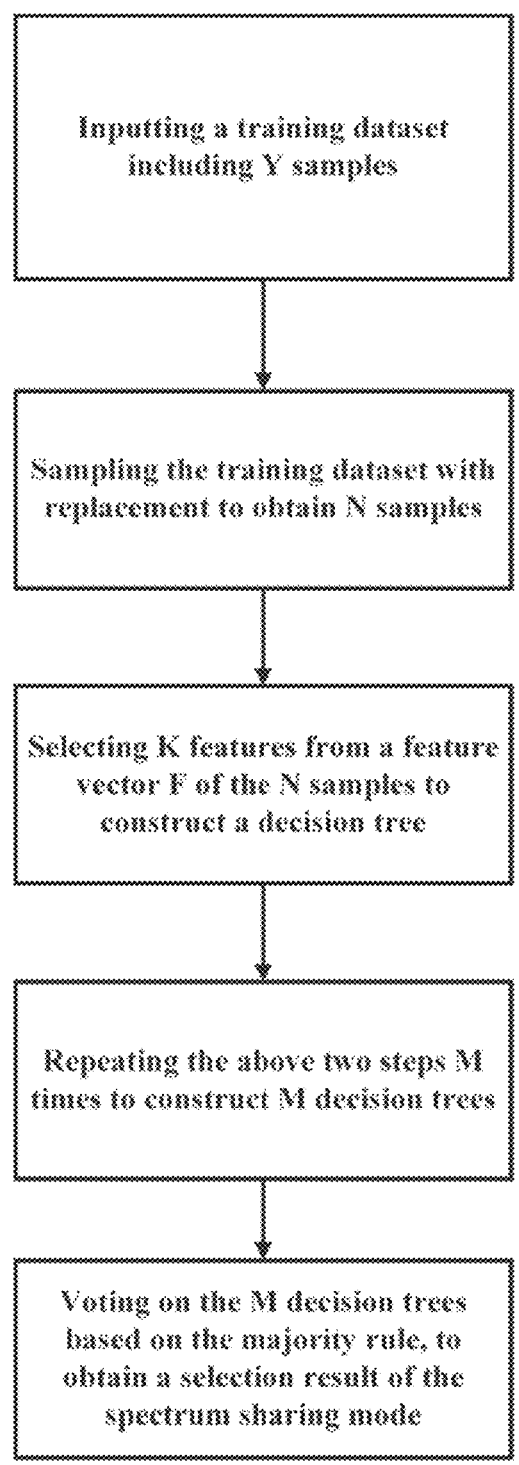
FIG. 4 shows an example of the principle of obtaining a model of correspondence relationship using a random forest algorithm.

FIG. 4 shows an example of the principle of obtaining the model of correspondence relationship using the random forest algorithm. In this example, three spectrum sharing modes including a vertical mode, a tilt mode and a horizontal mode are considered. As shown in FIG. 4, a training dataset containing Y samples is input first, and in each sample, the parameter of the UE is represented by a feature vector F. Next, the training dataset is sampled with replacement to obtain N samples. K features are then selected from the feature vectors F of these N samples to construct a decision tree. The above two steps, namely sampling and constructing the decision tree, are repeated M times, to construct M decision trees. A vote is casted for the constructed M decision trees following the majority rule, so as to obtain a selection result of the spectrum sharing mode, for example, one of the vertical mode, the till mode and the horizontal mode.

The first determining unit 101 determines the spectrum sharing mode for the UE using the model of correspondence relationship obtained by training. For example, when the feature vector of the UE is input into the model of correspondence relationship, the spectrum sharing mode of the UE may be obtained as an output.

When there are multiple UEs, the UEs perform communication, for example, D2D communication on the same frequency band through spectrum sharing. The second determining unit 102 determines a spectrum sharing scheme for the UEs based on the spectrum sharing mode for the respective UE. For example, the second determining unit 102 may take the determination of the spectrum sharing scheme as an optimization problem, for example, may take the overall network performance obtained by applying the spectrum sharing scheme as an optimization object, that is, determine the spectrum sharing scheme for the UEs by optimizing the overall network performance.

The overall network performance may be represented for example by a total spectrum utility which is a sum of spectrum utilities of all the UEs, and the spectrum utility of the UE indicates a degree of the service requirement of the UE being satisfied.

In an example, the spectrum utility of the UE may be evaluated from one or more of: spectrum satisfying degree, degree of latency satisfying, and degree of QoS/QoE satisfying. The spectrum satisfying degree is, for example, the degree of the spectrum bandwidth requirement of the UE being satisfied when applying a spectrum sharing scheme. The degree of latency satisfying is the degree of the latency requirement of the UE being satisfied when applying a spectrum sharing scheme. The degree of QoS/QoE satisfying is the degree of the requirement of QoS/QoE of the UE being satisfied when applying a spectrum sharing scheme.

Specifically, the spectrum utility of the UE may be a weighted sum of a function of the spectrum satisfying degree, a function of degree of latency satisfying, and a function of degree of QoS/QoE satisfying of the UE. For example, in order to correctly evaluate the degree of satisfying for the same indicator of the UEs with different service requirements, the indicator may be normalized with respect to the spectrum sharing mode of the UE.

For example, the spectrum utility of the UE may be a weighted sum of a function of spectrum satisfying degree, a function of the normalized latency, and a function of normalized QoS/QoE of the UE. The function of spectrum satisfying degree may be the ratio of the total number of channels allocated to the UE to the total number of channels required by the UE. The normalized latency is a normalized result of the latency of the UE with respect to a latency threshold corresponding to the spectrum sharing mode for the U E. The normalized QoS/QoE is a normalized result of the QoS/QoE of the UE with respect to a threshold of QoS/QoE corresponding to the spectrum sharing mode for the UE. A weight for each item represents a degree of importance of the item. QoS/QoE may be represented for example by to Signal to Interference plus Noise Ratio (SINR).

The equation (2) below shows an example of the spectrum utility of an i-th UE:

$$U_i = w_1 g_1(\tau_i) + w_2 g_2(\gamma_i) + w_3(n_i/N_i) \quad (2)$$

where, $$g_1(\tau_i) = 0.5 \times \left( \tanh\left( -\frac{\tau_i}{\tau_i^{th}} - \theta_{1,l} \right) / \sigma_{1,l} + 1 \right) \quad (3)$$

$$g_2(\gamma_i) = 0.5 \times \left( \tanh\left( \frac{\gamma_i}{\gamma_i^{th}} - \theta_{2,l} \right) / \sigma_{2,l} + 1 \right) \quad (4)$$

In the above equations (2) to (4), the subscript i represents the i-th UE, $g_1$ represents a function of the normalized latency, $g_2$ represents a function of the normalized SINR, and $n_i/N_i$ represents the spectrum satisfying degree, $n_i$ represents the total number of channels obtained by the i-th UE, and $N_i$ represents the total number of channels required by the i-th UE, $w_1$, $w_2$, and $w_3$ represent weights of the normalized latency, the normalized SINR, and the spectrum satisfying degree, reflecting the degree of importance to these three performance parameters in the process of spectrum management, respectively $\tau_l^{th}$ represents a latency threshold in an l-th spectrum sharing mode (simply referred to as a mode l), and $\gamma_l^{th}$ represents a SINR threshold in the mode l. $\theta_{1,l}$ and $\sigma_{1,l}$ represent respectively an offset parameter and a diffusion parameter of the function of the normalized latency in the mode l, and $\theta_{2,l}$ and $\sigma_{2,l}$ represent respectively an offset parameter and a diffusion parameter of the function of the normalized SINR in the mode l.

The total spectrum utility may be calculated as follows:

$$U = \Sigma_i U_i \quad (5)$$

It can be seen that the total spectrum utility takes into account the spectrum satisfying degree, the degree of QoS/QoE satisfying, and the degree of latency satisfying, and is suitable for spectrum management in diverse service scenarios. In addition, with the weights ($w_1$, $w_2$, and $w_3$) in the definition of the total spectrum utility, the degree of importance to the spectrum satisfying degree, the degree of importance to the degree of QoS/QoE satisfying, and the degree of importance to the degree of latency satisfying can be set according to specific application scenarios, so as to flexibly adjust the optimization object of the optimization algorithm.

It should be understood that the above is only a specific example of the spectrum utility, and this embodiment is not limited thereto.

The second determining unit 102 may, for example, determine the spectrum sharing scheme using a colony intelligence optimization algorithm. The case of determining the spectrum sharing scheme using an ant colony optimization algorithm supporting multi-mode as an example is described in detail below. The ant colony optimization algorithm supporting multi-mode in this embodiment is a colony intelligence algorithm obtained by improving the traditional ant colony optimization algorithm.

In the traditional ant colony optimization algorithm, an optimal path problem is solved by simulating the method of finding a path when an ant colony is looking for a food source. In the initial stage of the algorithm, ants are randomly arranged on various nodes of a system, and each ant marks the passed path by releasing a pheromone. As fie concentration of the pheromone accumulated on a path becomes higher, the path becomes more attractive to the ant. Finally, almost all ants choose the path with the highest concentration of pheromone so as to find the optimal path of the system.

The main parameters required by the traditional ant colony optimization algorithm are shown in Table 1 below.

TABLE 1

| Parameters | Representation | Physical Meaning |
|---|---|---|
| The number of ants | m | The number of ants required in the algorithm, an ant traverses the nodes in the system and finds the shortest path. |
| Pheromone increment | $\Delta \xi_{ij}^k$ | Pheromone released by the ant moving from a node i to a node j on a path k, and the total amount of pheromone on this path increases with this increment. |
| Pheromone volatile factor | ρ | Controlling effect of the previous pheromone on the path on the currently accumulated pheromone |
| Accumulated pheromone | $\xi_{ij}^k = (1 - \rho) \cdot \xi_{ij}^{k-1} + \Delta \xi_{ij}^k$ | Representing a currently accumulated value of pheromone on the path. The larger the accumulated pheromone is, the more attractive to the ant the path is. |

TABLE 1-continued

| | | |
|---|---|---|
| Heuristic information | $\eta_{ij}^k$ | Representing the expectation of the ant moving from the node i to the node j on the path k. |
| Moving probability | $p_{ij}^k = \dfrac{[\xi_{ij}]^\alpha \cdot [\eta_{ij}]^\beta}{\sum\limits_{s \in S}[\xi_{is}]^\alpha \cdot [\eta_{is}]^\beta}$ | Representing a probability of the ant moving from the node i to the node j on the path k. |
| Importance factor of the pheromone | $\alpha$ | Representing a degree of importance of the pheromone. The larger the value is, the greater the influence of the pheromone on the moving probability is. |
| Importance factor of the heuristic information | $\beta$ | Representing a degree of importance of the heuristic information. The larger the value is, the greater the influence of the heuristic information on the moving probability is. |

It can be seen from Table 1 that the traditional ant colony optimization algorithm is suitable for the optimal path finding problem with the optimization object being the shortest path of the system. In this embodiment, the above-mentioned traditional ant colony, optimization algorithm is improved, so as to be applied to the scenario of determining the spectrum sharing scheme.

In the improved ant colony optimization algorithm supporting multi-mode, the UE serves as a node, and the order of the nodes being passed by the ant on the path is the order of the spectrum allocation. In an iteration of the algorithm, each ant traverses all nodes without repetition. After each ant traversing all the nodes, a path is formed. Therefore, one path corresponds to one spectrum sharing scheme.

In addition, the ant releases a pheromone when passing through each section of path (for example, from the node i to the node j), and the pheromone is added to the accumulated pheromone at each node as a pheromone increment. The accumulated pheromone together with the heuristic information affects the probability of the ant moving to the next node. If the number of ants is m, in each iteration, m paths, that is, m spectrum sharing schemes, are obtained. After completing the set number of iterations, the one with the largest total spectrum utility is selected from among all of the obtained spectrum sharing schemes as the finally determined spectrum sharing scheme.

In the ant colony optimization algorithm supporting multi-mode in this embodiment, an optimization process is related to the spectrum sharing mode. For example, the parameter in the algorithm is related to the spectrum sharing mode. Compared with the traditional ant colony optimization algorithm, the parameter in the ant colony optimization algorithm supporting multi-mode is changed. For example, the pheromone increment represents a degree of satisfying at least a part of the service requirement of the UE when applying the current spectrum sharing scheme. At least a part of the service requirement includes, for example, the requirement of QoS/QoE and the requirement of data transmission rate. Furthermore, the heuristic information for the UE may be determined based on the requirement of data transmission rate of the UE and the priority level of the spectrum sharing mode of the UE.

Table 2 shows the parameters used in the ant colony optimization algorithm supporting multi-mode which are different from the definition in Table 1.

TABLE 2

| Parameters | Representation | Physical Meaning |
|---|---|---|
| Pheromone increment | $\Delta\xi_{ij}^k = Q \times \varphi_j + P_l \times g_2(\overline{\gamma}_j)$ | This pheromone increment takes into account the spectrum satisfying degree and the degree of QoS/QoE satisfying of the node (i.e., UE) j. |
| Spectrum satisfying degree | $\varphi_j = n_j/N_j$ | Representing a ratio of the number of channels $n_j$ obtained by the UE-j to the number of channels $N_j$ required by the UE-j. |
| Function of normalized SINR | $g_2(\overline{\gamma}_j) = 0.5 \times \left(\tanh\left(\dfrac{\gamma_j}{\gamma_l^{th}} - \theta_{2,l}\right)\bigg/\sigma_{2,l} + 1\right)$ | Normalizing the SINR of the UE-j using the SINR threshold $\gamma_l^{th}$, an offset parameter $\theta_{2,l}$, and a diffusion parameter $\sigma_{2,l}$ that correspond to the spectrum sharing mode l of the UE-j |
| Amplification factor of pheromone | $\{Q, P_l\}$ | The part of the spectrum satisfying degree in the pheromone increment is amplified with Q, the part of normalized SINR in the mode l is amplified with $P_l$. |

TABLE 2-continued

| Parameters | Representation | Physical Meaning |
| --- | --- | --- |
| Heuristic information | $\eta_{lj} = \lambda_l N_j$ | The number of channels $N_j$ required by the UE-j and the mode priority level $\lambda_l$ determined by the mode l would inspire the ant to move towards the node j. |
| Mode priority level | $\lambda_l$ | The priority level of the mode l. |

The second determining unit 102 may determine the spectrum sharing scheme using the above parameters. An interference overlay map may be used as the basis for traversing the UEs. The interference overlay map is constructed based on the relevant information of each UE. Each node in the interference overlay map represents one UE or a group of UEs, and an edge between two nodes indicates that there is an interference relationship between the two nodes. Whether there is an interference relationship between two UEs may be determined based on the SINR threshold of the UE, for example. The interference described here mainly refers to co-channel interference, and adjacent-channel interference may also be considered.

The second determining unit 102 may be configured to, for example, iteratively perform the following operations: randomly selecting multiple nodes in the interference overlay map as starting nodes; for each of the multiple starting nodes, traversing all nodes in the interference overlay map from the starting node and allocating the spectrum resources to each node in the order of traversal to obtain a spectrum sharing scheme corresponding to a path starting from the starting node, where during a traversal process, the next node to be moved to is determined based on the accumulated pheromone and heuristic information of the nodes not passed, calculating, based on the spectrum sharing scheme, the pheromone increment determined by the corresponding path and accumulating the pheromone increment to the accumulated pheromone to obtain an updated accumulated pheromone, and calculating the total spectrum utility of the spectrum sharing scheme, where the updated accumulated pheromone is used for a traversal process starting from the next starting node; and selecting a spectrum sharing scheme with the highest total spectrum utility from the spectrum sharing schemes corresponding to the paths starting from each of the starting nodes. The number of iterations to be performed may be predetermined. The second determining unit 102 is further configured to determine a spectrum sharing scheme with the highest total spectrum utility from the multiple spectrum sharing schemes obtained by multiple iterations, as the finally determined spectrum sharing scheme.

In the above iterative process, the pheromone increment and the heuristic information listed in Table 2 may be used, for example. In this example, the spectrum satisfying degree and the normalized SINR are considered in the pheromone increment, so that both spectrum utilization efficiency and differentiated service requirements in the process of spectrum management can be taken into consideration. In addition, the normalized SINR is introduced into the pheromone increment, and the SINR is normalized based on the SINR threshold in different spectrum sharing modes, thereby reducing complexity while achieving differentiated management.

As shown in Table 2, the amplification factor of pheromone is also introduced into the pheromone increment. The value of the amplification factor of pheromone may be determined, for example, according to the degree of importance to the spectrum satisfying degree or the degree of SINR satisfying of the UE in a certain mode, so as to achieve flexible spectrum management. On the other hand, the channel requirement and mode priority level of the UE are considered in the heuristic information. For example, a spectrum may be preferentially allocated to the UE in a certain mode according to the degree of importance to different modes, so as to realize flexible and differentiated spectrum management.

It should be understood that the above description of the algorithm and related parameters is only an example, this embodiment is not limited thereto, and another appropriate colony intelligence algorithm may also be used.

In addition, the spectrum management scheme according to this embodiment may also be applied to Radio Access Network (RAN) management in a network slice. The network slice is a new technology based on network function virtualization (NFV) and software defined network (SDN). The basic idea of the network slice is to divide a network into multiple virtual network slices depending on different requirements of services, thereby providing a customized complete logical network slice for each service type. A network slice includes a RAN slice and a Core Network (CN) slice.

Figure 5:
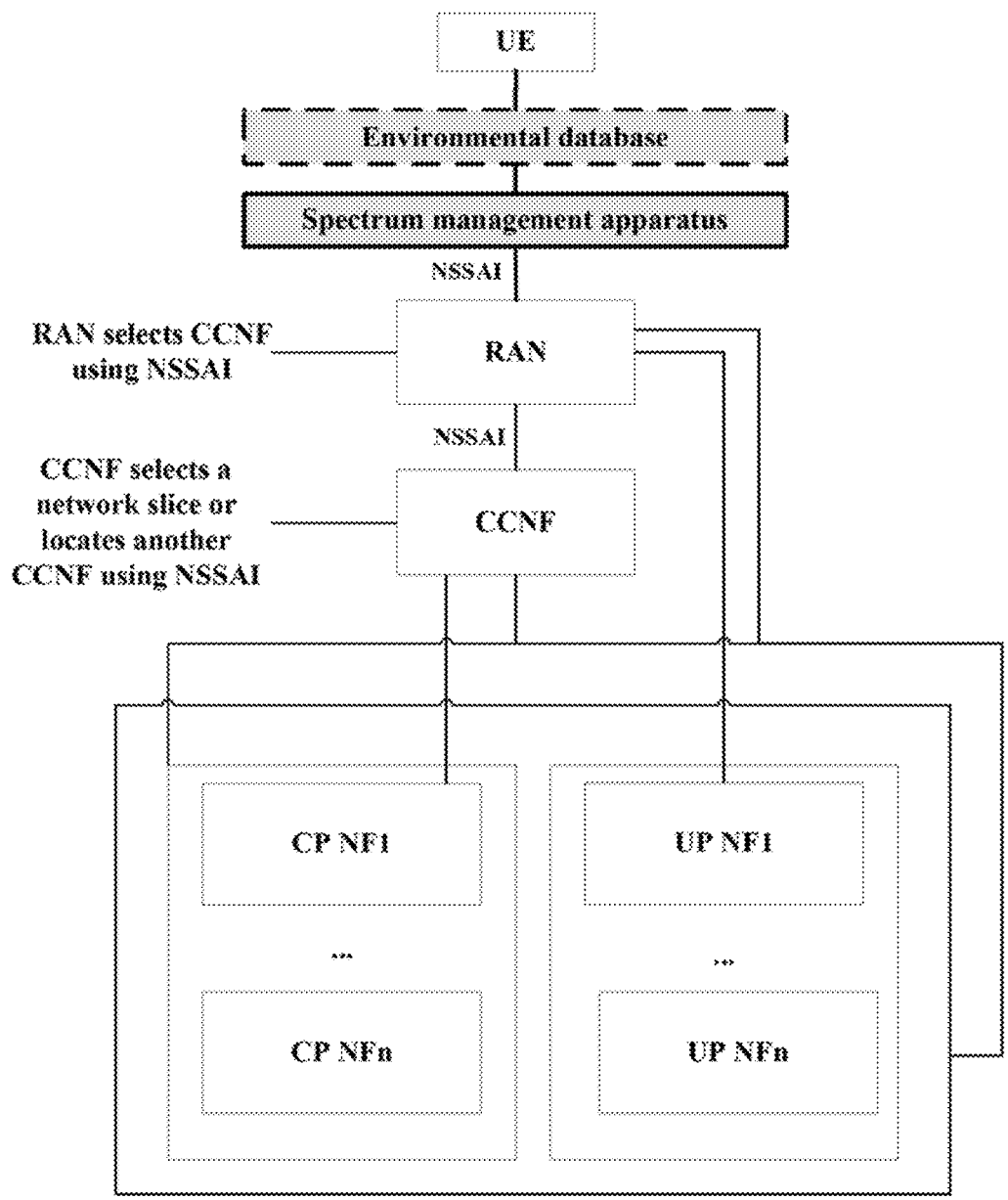
FIG. 5 shows a schematic diagram of applying a spectrum management scheme according to the embodiment to a network slice architecture.

FIG. 5 shows a schematic diagram of applying the spectrum management scheme according to this embodiment to a network slice architecture. The components implementing the spectrum management scheme are added between the UE and the RAN, and the other part of the network slice architecture is a network slice selection architecture defined by 3GPP. For example, the RAN selects the common control network function (CCNF) using the network slice selection assistance information (NSSAI), and the CCNF selects a network slice or locates another CCNF using NSSAI. CP stands for a control plane, UP stands for a user plane, and NF stands for a network function.

The solid-line box filled in gray in FIG. 5 represents a spectrum management apparatus, which includes the electronic apparatus 100 according to this embodiment. In addition, the dashed-line box filled in gray shown in FIG. 5 represents an environmental database, which is configured to store the relevant information of the UE and the relevant parameters required for determining the spectrum sharing scheme and the like. The environmental database is an optional component, and is described in detail hereinafter.

In the example of FIG. 5, the UE provides apparatus information and application information (e.g., information on the service requirement) to the spectrum management apparatus. The spectrum management apparatus generates an NSSAI for selecting a CN slice in the next step, where the spectrum sharing mode of the UE is indicated by the NSSAI.

The NSSAI defined by 3GPP includes a slice service type (SST) and may include a slice differentiator. The spectrum sharing mode of the UE may be indicated by SST, for example.

In addition, the electronic apparatus 100 in the spectrum management apparatus may provide a differentiated spectrum sharing scheme for the UE with different service requirement as described above, so as to share spectrum among network slices.

Figure 6:
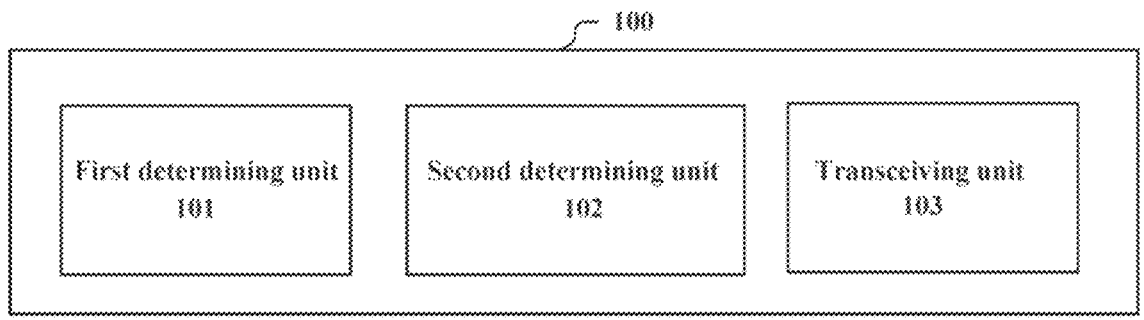
FIG. 6 is another block diagram showing functional modules of an electronic apparatus for wireless communications according to an embodiment of the present disclosure.

As shown in FIG. 6, the electronic apparatus 100 may further include a transceiving unit 103, which is configured to acquire one or more of the following: information on the service requirement of the UE, information on the location of the UE, and information on the emitting power of the UE. The information is used to determine the spectrum sharing mode and/or spectrum sharing scheme for the UE.

In addition, the second determining unit 102 is further configured to allocate, for each UE, the spectrum resources based on the determined spectrum sharing scheme. The transceiving unit 103 is configured to provide an allocation result of the spectrum resources to each UE.

In order to further improve spectrum management efficiency, the transceiving unit 103 is further configured to acquire the spectrum utility obtained by each UE based on the allocated spectrum resources, and the second determining unit 102 evaluates the spectrum sharing scheme based on the spectrum utilities, and/or optimizes the determination of the spectrum sharing scheme, for example, optimizes some parameters in the algorithm.

The electronic apparatus 100 may directly perform the various communication operations mentioned above with the UE, or may perform indirect communication with the UE via another device.

In one example, the electronic apparatus 100 performs the communication with the UE via an environmental database. Specifically, the UE reports the above information (the information on the service requirement of the UE, the information on the location of the UE, and the information on the emitting power of the UE and the like) to the environmental database, and the transceiving unit 103 is configured to acquire the information from the environmental database.

In addition, the transceiving unit 103 is further configured to acquire relevant parameters, for example, including multiple sets of parameters respectively corresponding to spectrum sharing modes, required for determining the spectrum sharing scheme from the environmental database. Taking Table 2 as an example, these parameters may include the SINR threshold $\gamma_l^{th}$, an offset parameter $\theta_{2,l}$, a diffusion parameter $\sigma_{2,l}$, a latency threshold $\tau_l^{th}$, an amplification factor of pheromone $\{Q, P_l\}$, a mode priority level $\lambda_l$, and the like for each spectrum sharing mode. Of course, these parameters may also include other parameters used in the algorithm shared by spectrum sharing modes.

The transceiving unit 103 is further configured to transmit information on the spectrum sharing mode of the UE determined by the electronic apparatus 100 to the environmental database, so that the environmental database provides the electronic apparatus 100 with relevant parameters required for determining the spectrum sharing scheme based on the information.

In addition, the transceiving unit 103 may also provide the allocation result of the spectrum resources to the environmental database. Further, the environmental database distributes the allocation result to each UE. As described above, the environmental database may also acquire the spectrum utility obtained by each UE based on the allocated spectrum resources. The transceiving unit 103 acquires the spectrum utility from the environmental database, and the second determining unit 102 evaluates the spectrum sharing scheme based on these spectrum utilities, and/or optimizes the determination of the spectrum sharing scheme, for example, optimizes some parameters used in the algorithm. The transceiving unit 103 may also, for example, acquires the total spectrum utility from the environmental database.

In summary, the electronic apparatus 100 according to the present embodiment classifies the UEs into different spectrum sharing modes according to their service requirements, and determines a spectrum sharing scheme for the UEs based on the spectrum sharing modes of the UEs, thereby realizing efficient spectrum sharing among UEs with diverse service requirements while effectively simplifying the complexity of spectrum differentiation management in massive connection scenarios, and improving spectrum utilization efficiency. In addition, the electronic apparatus 100 according to this embodiment uses the colony intelligence optimization algorithm to optimize the spectrum sharing scheme, so as to flexibly adjust the spectrum management method according to the change of the application scenario, thereby effectively improving the spectrum utilization efficiency.

Second Embodiment

Figure 7:
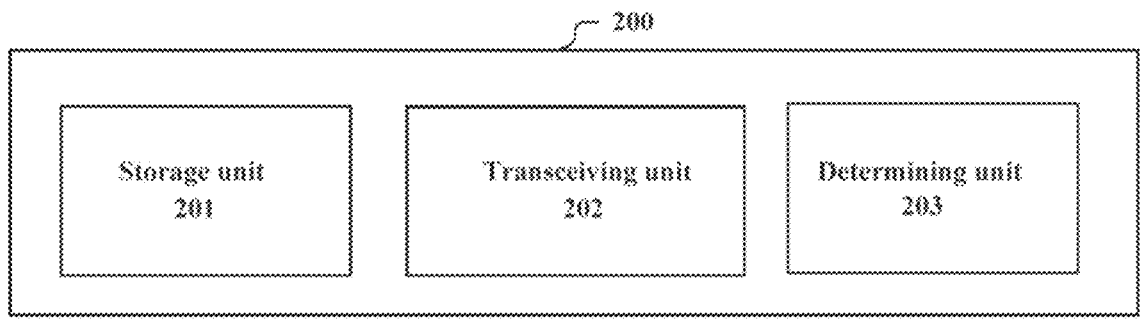
FIG. 7 is a block diagram showing functional modules of an environmental database according to another embodiment of the present disclosure.

FIG. 7 is a block diagram showing functional modules of an environmental database 200 according to another embodiment of the present disclosure. As shown in FIG. 7, the environmental database 200 includes: a storage unit 201, a transceiving unit 202 and a determining unit 203. The storage unit 201 is configured to store a correspondence relationship between the spectrum sharing mode of the UE and a parameter required for determining a spectrum sharing scheme of the UE. The spectrum sharing mode of the UE is determined based on the service requirement of the UE. The transceiving unit 202 is configured to acquire the spectrum sharing mode of the UE. The determining unit 203 is configured to determine the required parameter according to the correspondence relationship based on the spectrum sharing mode.

Similarly, the transceiving unit 202 and the determining unit 203 may be implemented by one or more processing circuitry. The processing circuitry may be implemented as a chip, for example. The storage unit 201 may be implemented as various memories including, for example, a random-access memory (RAM), a read only memory (ROM), a semiconductor memory, a flash memory, a hard disk. In addition, the storage unit 201 may also be implemented as various network storage media. It should be understood that each functional unit in the apparatus shown in FIG. 7 is only a logical module divided according to the specific function implemented by the functional unit, and is not used to limit the implementation manner.

The environmental database 200 may be provided, for example, on the side of a central management apparatus or a spectrum management apparatus or be communicatively connected to the central management apparatus or the spectrum management apparatus. Here, it should also be noted that the environmental database 200 may be implemented at a chip level, or may also be implemented at a device level. For example, the environmental database 200 may operate as the central management apparatus or spectrum management apparatus or as a separate entity, and may also include external devices such as a memory, a transceiver (not shown). The memory may be used to store programs to be executed to achieve various functions and related data information. The transceiver may include one or more communication interfaces to support communication with different devices (e.g., user equipment, and a spectrum management apparatus), and the implementation form of the transceiver is not particularly limited herein.

The description about the spectrum sharing mode in the first embodiment is also applicable to this embodiment, and is not repeated here. As mentioned above, the spectrum sharing mode of the UE is determined by the spectrum management apparatus based on the service requirement of the UE. Correspondingly, the transceiving unit 202 is further configured to acquire UE information from the UE, where the UE information includes one or more of the following: information on the location of the UE, information on the service requirement of the UE, and information on the emitting power of the UE. The storage unit 201 stores the UE information reported by each UE.

The transceiving unit 202 provides the UE information to the spectrum management apparatus, so that the spectrum management apparatus determines the spectrum sharing mode of the UE based on at least a part of UE information. The transceiving unit 202 is further configured to acquire the spectrum sharing mode of the UE from the spectrum management apparatus, and provide the required parameters determined by the determining unit 203 to the spectrum management apparatus.

The storage unit 201 stores the correspondence relationship between the spectrum sharing mode and the parameter required for determining the spectrum sharing scheme, so that the determining unit 203 determines the required parameter by query, for example. The determination of the spectrum sharing scheme and the parameter required in the determination process have been described in detail in the first embodiment, and the details thereof are also applicable to this embodiment, and are not repeated here.

In addition, the spectrum management apparatus determines a spectrum sharing scheme based on the parameter provided by the environmental database and the UE information, and allocates spectrum resources to the LE according to the determined spectrum sharing scheme. The transceiving unit 202 acquires the allocation result of spectrum resources from the spectrum management apparatus, and provides the allocation result to each UE.

As mentioned above, in order to further optimize the spectrum sharing scheme and improve the spectrum management efficiency, the transceiving unit 202 may further be configured to acquire the spectrum utility obtained by each UE based on the allocated spectrum resources and provide the spectrum utility to the spectrum management apparatus. The spectrum management apparatus evaluates the spectrum sharing scheme based on these spectrum utilities, and/or optimizes the determination of the spectrum sharing scheme, for example, optimizes some parameters in the algorithm, and the like. For example, the transceiving unit 202 may provide the total spectrum utility to the spectrum management apparatus.

Figure 8:
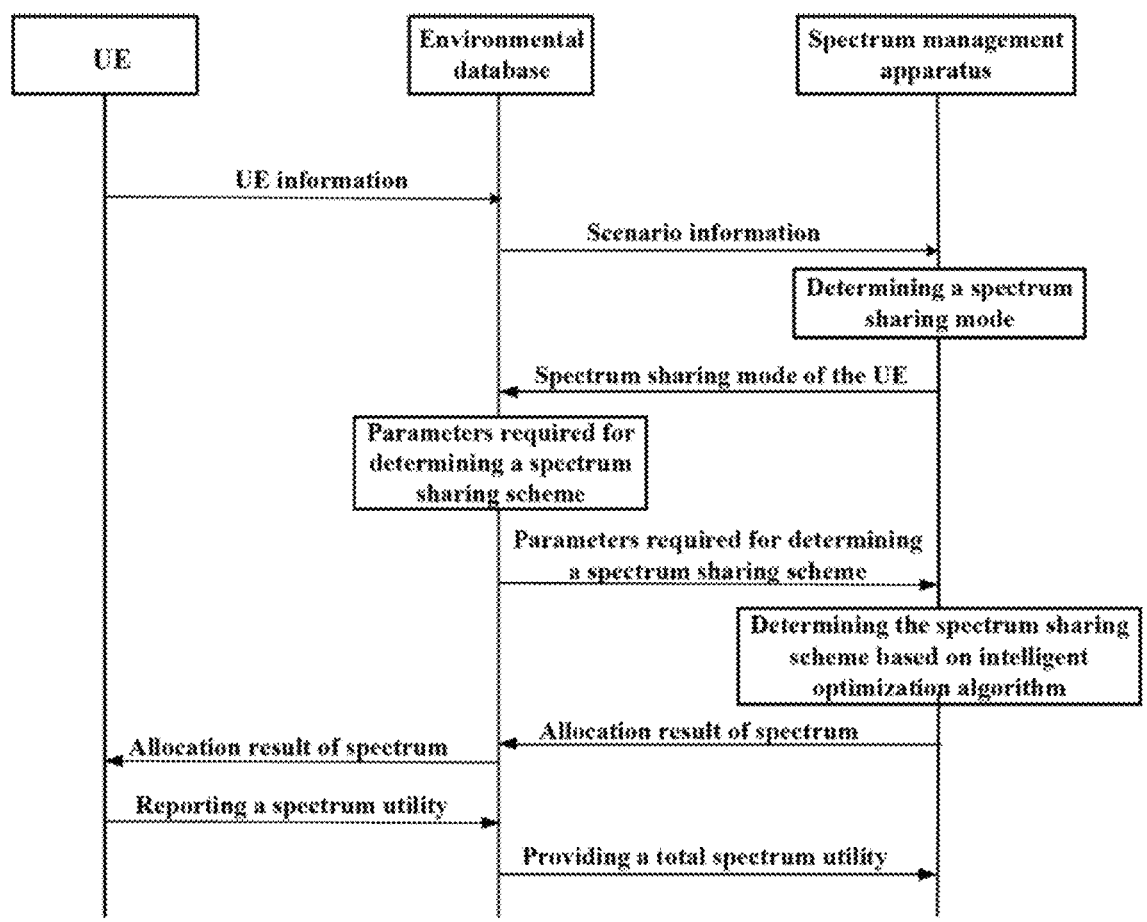
FIG. 8 shows an example of an information procedure among a spectrum management apparatus, an environmental database and user equipment.

For ease of understanding, FIG. 8 shows a schematic diagram of an information procedure among the spectrum management apparatus, the environmental database and the UE. This information procedure is only illustrative and does not limit the application.

In FIG. 8, the UE reports the UE information to the environmental database, for example, including the location, the emitting power, and service requirements (including requirement of QoS/QoE, requirement of the latency, requirement of the data transmission rate) of the UE. The environmental database reports scenario information, for example, UE 24) information of each UE, to the spectrum management apparatus. The spectrum management apparatus, for example, determines the spectrum sharing mode of each UE using a machine learning algorithm, and transmits the information of the spectrum sharing mode to the environmental database. The environmental database determines the parameters required for the spectrum management apparatus to determine the spectrum sharing scheme according to the received spectrum sharing modes, such as the SINR threshold, the latency threshold, the offset parameter, the diffusion parameter, the latency threshold, the pheromone amplification factor, and the mode priority level in different spectrum sharing modes; and provides these parameters to the spectrum management apparatus. The spectrum management apparatus determines the spectrum sharing scheme using an intelligent optimization algorithm such as the ant colony optimization algorithm supporting multi-mode described in the first embodiment, allocates spectrum resources to the UE according to the spectrum sharing scheme, and provides the allocation result of the spectrum resources to the environmental database. The environmental database provides the allocation result of the spectrum resources to each UE. After communicating by using the allocated spectrum resources, the UE reports its spectrum utility to the environmental database, and the environmental database may provide the total spectrum utility of respective UEs to the spectrum management apparatus.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 9:
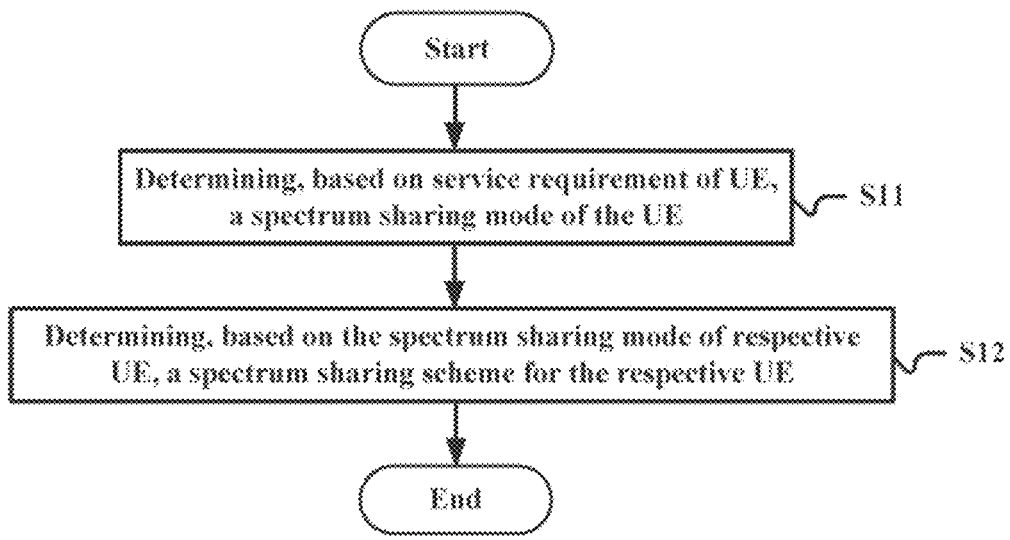
FIG. 9 shows a flow chart of a method for wireless communications according to an embodiment of the present disclosure.

FIG. 9 shows a flowchart of a method for wireless communications according to an embodiment of the present disclosure. The method includes: determining, based on a service requirement of each of at least one user equipment, a spectrum sharing mode suitable for the user equipment (S11); and determining, based on the spectrum sharing mode for respective user equipment, a spectrum sharing scheme for the respective user equipment (S12). The method may be performed, for example, on the side of a spectrum management apparatus.

The service requirement may include, for example, one or more of the following: a requirement of QoS or QoE, a latency requirement, and a requirement of a data transmission rate.

In step S11, the spectrum sharing mode of the UE may be determined based on a pre-trained model of correspondence relationship. The model of correspondence relationship represents the correspondence relationship between the parameter of the UE and the spectrum sharing mode of the UE, where the parameter of the UE is based on at least the service requirement of the UE.

The model of correspondence relationship may be obtained using a machine learning algorithm. The machine learning algorithm includes, for example, a multi-class supervised learning algorithm. The multi-class supervised learning algorithm may include one of a random forest algorithm, a K-neighbor algorithm, and a naive Bayes algorithm.

As an example, the spectrum sharing mode may include: a low-latency service requirement mode, a high data transmission rate requirement mode, and a general data service requirement mode.

In an example, the spectrum sharing mode of the UE may be indicated by network slice assistance information.

In step S12, the overall performance of the network obtained by applying the spectrum sharing scheme is used as an optimization object in determining the spectrum sharing scheme. The overall performance of the network may be represented by the total spectrum utility. The total spectrum utility is the sum of the spectrum utilities of all the UEs. The spectrum utility of a UE indicates the degree of the service requirement of the UE being satisfied.

The spectrum utility of the UE is, for example, a weighted function of a function of spectrum satisfying degree, a function of the normalized latency, and a function of the normalized QoS/QoE of the UE. The normalized latency is a normalized result of the latency of the UE with respect to a latency threshold corresponding to the spectrum sharing mode for the UE. The normalized QoS/QoE is a normalized result of the QoS or QoE of the UE with respect to a threshold of QoS or QoE corresponding to the spectrum sharing mode for the UE. A weight for each item represents a degree of importance of the item. QoS or QoE may be represented by SINR.

In step S12, a spectrum sharing scheme may be determined using an ant colony optimization algorithm supporting multi-mode, where the optimization process of the ant colony optimization algorithm supporting multi-mode is related to the spectrum sharing mode. In the ant colony optimization algorithm supporting multi-mode, the pheromone increment represents a degree of satisfying at least a part of the service requirement of the UE when applying the current spectrum sharing scheme. At least a part of the service requirement includes, for example, the requirement of QoS or QoE and the requirement of data transmission rate. In the ant colony optimization algorithm supporting multi-mode, the heuristic information for the UE may be determined based on the requirement of data transmission rate of the UE and the priority level of the spectrum sharing mode of the UE.

In step S12, the following operations may be performed iteratively: randomly selecting multiple nodes in the interference overlay map as starting nodes, where the interference overlay map is constructed based on relevant information of UEs, and each node in the interference overlay map represents one UE or a group of UEs, an edge between two nodes indicates that there is an interference relationship between the two nodes; for each of the multiple starting nodes, traversing all nodes in the interference overlay map from the starting node and allocating spectrum resources to each node in the order of traversal to obtain a spectrum sharing scheme corresponding to the path starting from the starting node, and in the traversal process, the next node to be moved to is determined based on the accumulated pheromone and heuristic information of nodes not passed; calculating, based on the spectrum sharing scheme, the pheromone increment determined by the path and accumulating the calculated pheromone increment to the accumulated pheromone to obtain the updated accumulated pheromone, and calculating the total spectrum utility of the spectrum sharing scheme, where the updated accumulated pheromone is used for the traversal process starting from the next starting node; and selecting a spectrum sharing scheme with the highest total spectrum utility from the spectrum sharing schemes corresponding to the paths starting from each of the starting nodes. A spectrum sharing scheme with the highest total spectrum utility is determined from among the multiple spectrum sharing schemes obtained by multiple iterations, as the finally determined spectrum sharing scheme.

Although not shown in the drawings, the above method may further include: acquiring one or more of the following information: information on service requirement of the UE, information on the location of the UE, and information on the emitting power of the UE. The information may be acquired, for example, from an environmental database. The relevant parameters required for determining the spectrum sharing scheme may also be acquired from the environmental database. The relevant parameters may include multiple sets of parameters respectively corresponding to spectrum sharing modes.

The above method may further include: allocating the spectrum resources to each UE based on the determined spectrum sharing scheme, and optimizing the determination of the spectrum sharing scheme based on the spectrum utility obtained by the UE based on the spectrum resources.

Figure 10:
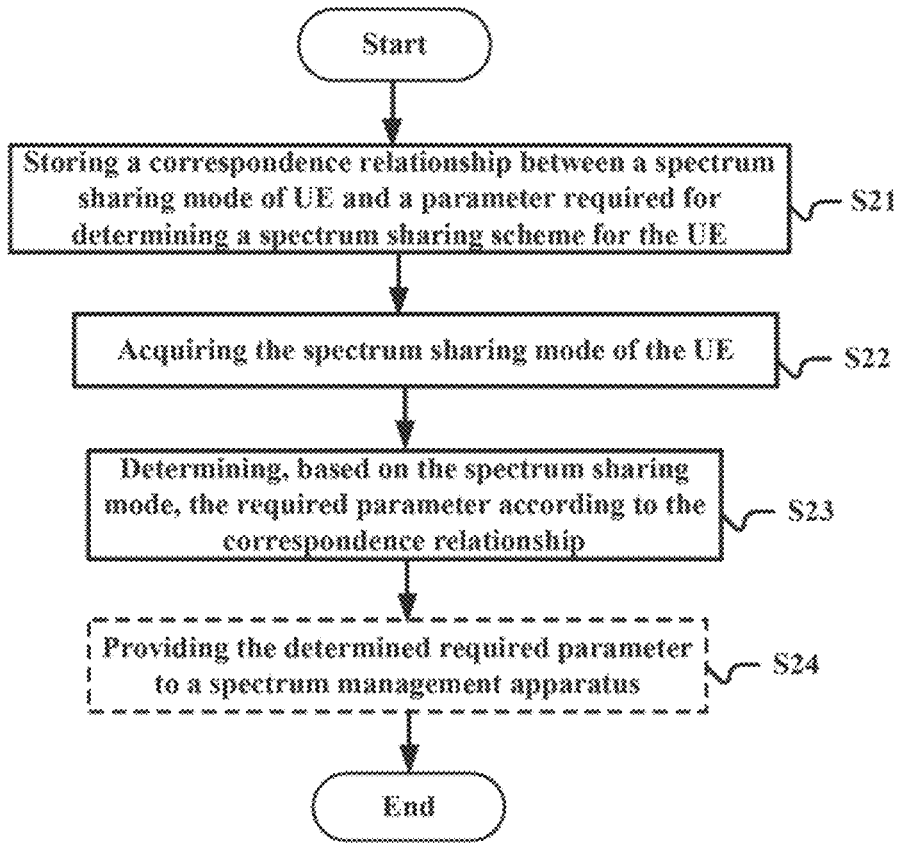
FIG. 10 is a flow chart of a method for wireless communications according to another embodiment of the present disclosure.

FIG. 10 shows a flowchart of a method for an environmental database according to an embodiment of the present disclosure. The method includes: storing the correspondence relationship between the spectrum sharing mode of the UE and the parameter required for determining the spectrum sharing scheme for the UE (S21), where the spectrum sharing mode of the UE is determined based on the service requirement of the UE; acquiring the spectrum sharing mode of the UE (S22); and determining, based on the spectrum sharing mode, the required parameter based on the stored correspondence relationship (S23). The method, for example, may be performed on the side of the environmental database.

The above method may further include the following step: storing UE information reported by each UE. The UE information includes, for example, one or more of: information on the location of the UE, information on the service requirement of the UE, and information on the emitting power of the UE.

In step S11, the spectrum sharing mode of the UE is acquired from the spectrum management apparatus, and as shown by the dashed line box in FIG. 10, the above method further includes a step S24 of: providing the determined required parameter to the spectrum management apparatus.

Note that the above methods may be used in combination or individually, the details thereof have been described in detail in the first to second embodiments and thus are not repeated herein.

Figure 11:
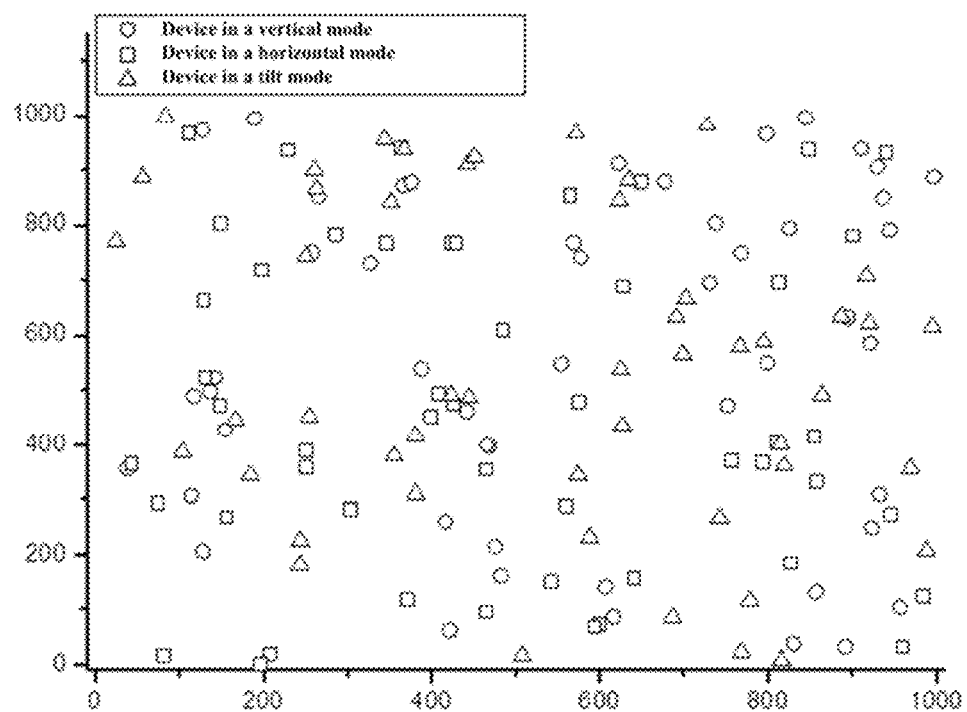
FIG. 11 shows a schematic diagram of a simulation scenario.

Further, the advantages of the spectrum sharing scheme of the present disclosure are described through a simulation example. FIG. 11 shows a schematic diagram of a simulation scenario. The simulation scenario takes a coexistence scenario of 150 D2D communication links as an example. The location of the transmitting end UE is shown in the FIG. 11. It is assumed that the distance between the receiving end UE the transmitting end UE is 50 meters. The specific simulation parameters are configured as follows: a simulation area of 1000 m*1000 m; the frequency of 3500 MHz; the number of channels of 10; a bandwidth of 5 MHz; a path loss index of 3; the emitting power of 0~25 dBm; and a latency of 0~1000 ms. In the simulation, the three spectrum sharing modes of vertical, horizontal and tilt spectrum sharing modes mentioned above are considered, and UEs respectively suitable for these three modes are distributed in the simulation area as shown in FIG. 11.

Figure 12:
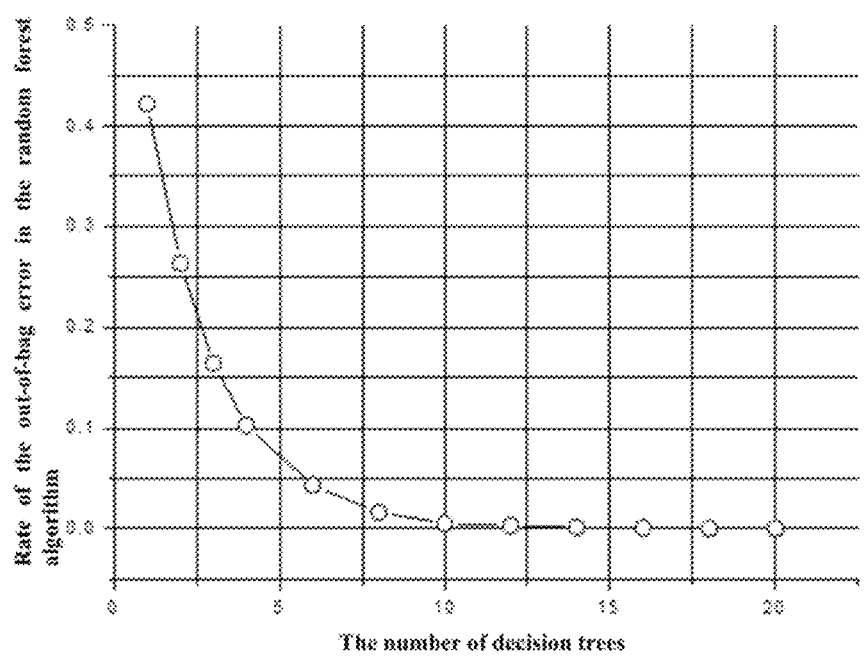
FIG. 12 shows a rate of an out-of-bag error rate of the random forest algorithm.

Before determining the spectrum sharing scheme, the validity of determining the spectrum sharing mode using the random forest algorithm is verified first. FIG. 12 shows a rate of the out-of-bag (OOB) error of the random forest algorithm. It can be seen that in a case that the number of decision trees in the random forest exceeds 15, the classification error rate drops to 0, indicating that the spectrum sharing mode can be effectively determined using the random forest algorithm.

Figure 13:
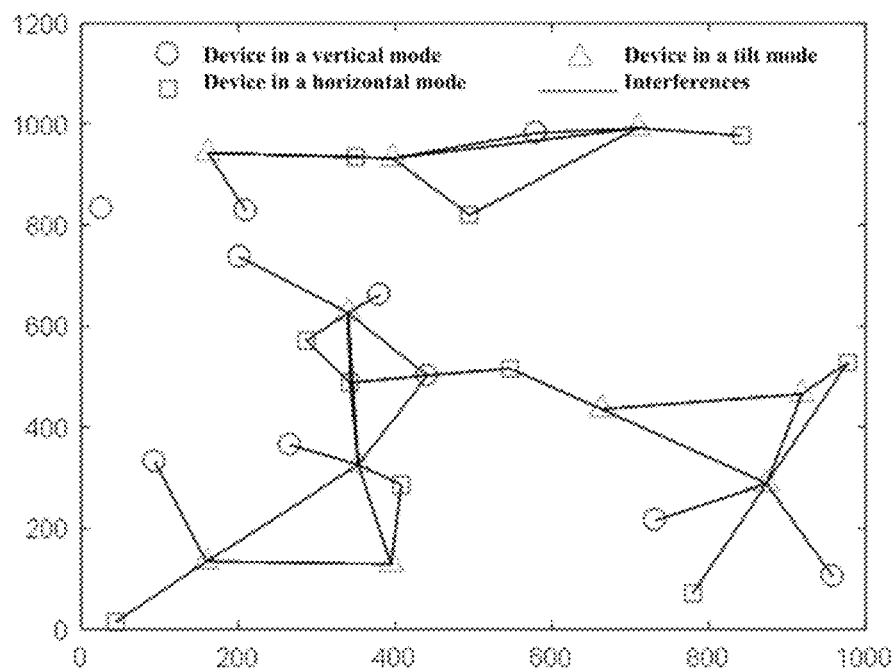
FIG. 13 is a graph showing an interference overlay map obtained by simulation.

In the simulation, the interference overlay map is obtained based on the emitting power and information on the location of the UE, and is used as the basis for determining the spectrum sharing scheme. FIG. 13 shows interference overlay map obtained by simulation.

In order to fully verify the performance of the proposed method in the present disclosure, the proposed method is compared with two comparison algorithms (comparison algorithm 1 and comparison algorithm 2) in the simulation. In the comparison algorithm 1, the spectrum resources are equally divided into three resource sets and allocated to three different service types. The difference between the comparison algorithm 1 and the method proposed in the present disclosure is that: in the comparison algorithm 1, the resources are divided into three resource sets independent of each other, and UEs of a service type have access to only resources in one resource set. However, in the algorithm in the present disclosure, different UEs can share all the spectrum resources, so that more UEs are served under limited resource constraints. In the comparison algorithm 2, all UEs reuse the spectrum resource and the traditional ant colony optimization algorithm is adopt, that is, the service requirements of different modes are not considered in the parameter of the ant colony optimization algorithm. Instead, the spectrum is collectively allocated to all UEs.

Figure 14:
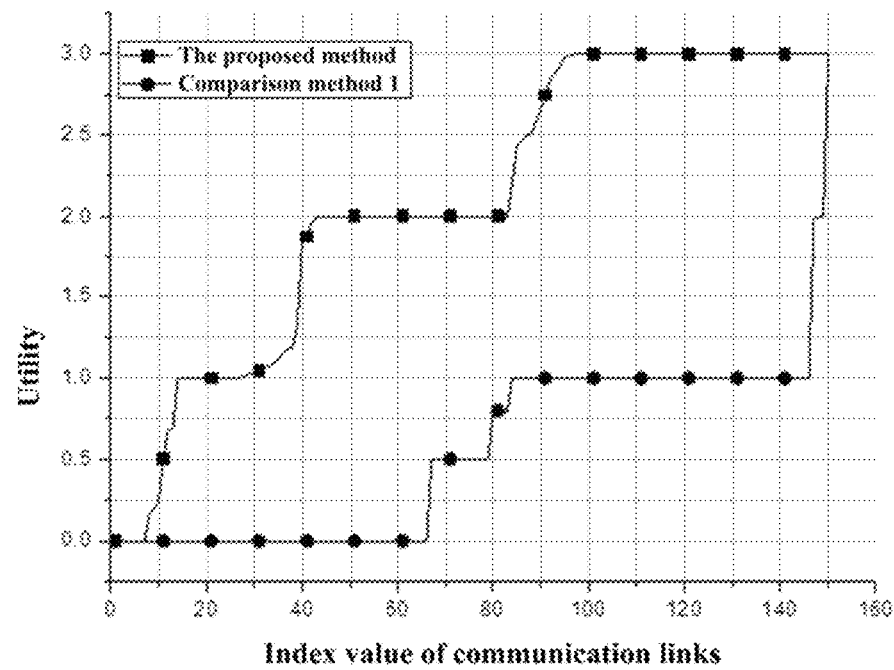
FIG. 14 is a graph showing performance comparison between the method according to the present disclosure and a comparison method 1.
Figure 15:
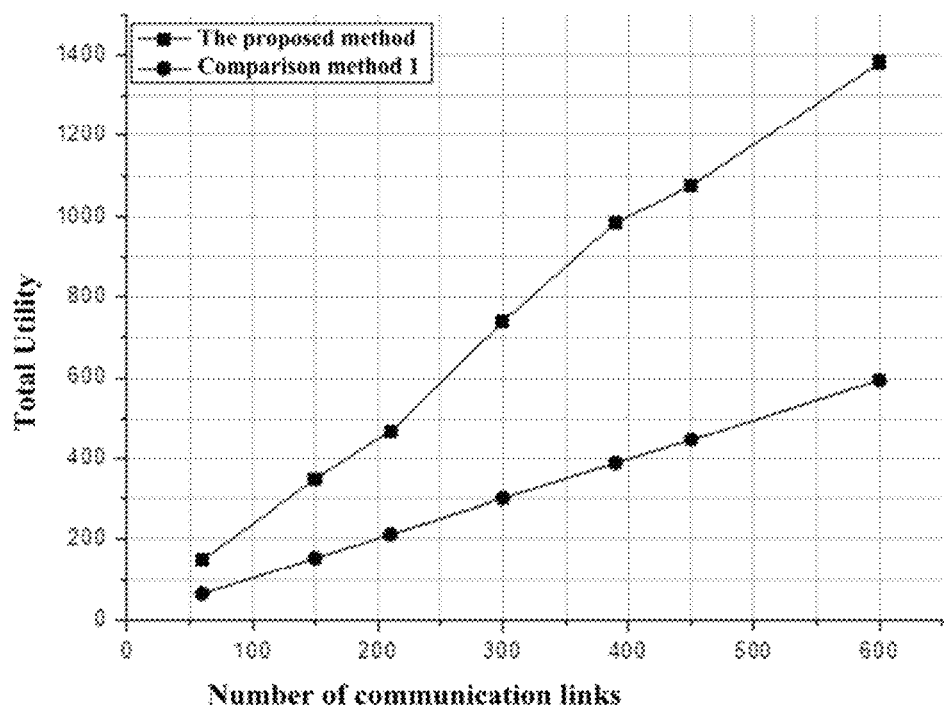
FIG. 15 is another graph showing performance comparison between the method according to the present disclosure and the comparison method 1.

FIG. 14 is a graph showing performance comparison between the method according to the present disclosure and the comparison method 1. It can be seen that the method according to the present disclosure can effectively improve the spectrum utility for all the UEs. In addition, FIG. 15 is another graph showing performance comparison between the method according to the present disclosure and the comparison method 1. It can be seen that the total spectrum utility of the system with the method according to the present disclosure is always higher than that of the comparison method 1. Further, as the number of communication links increases (the number of UEs increases), the effect of performance improvement is more apparent.

Figure 16:
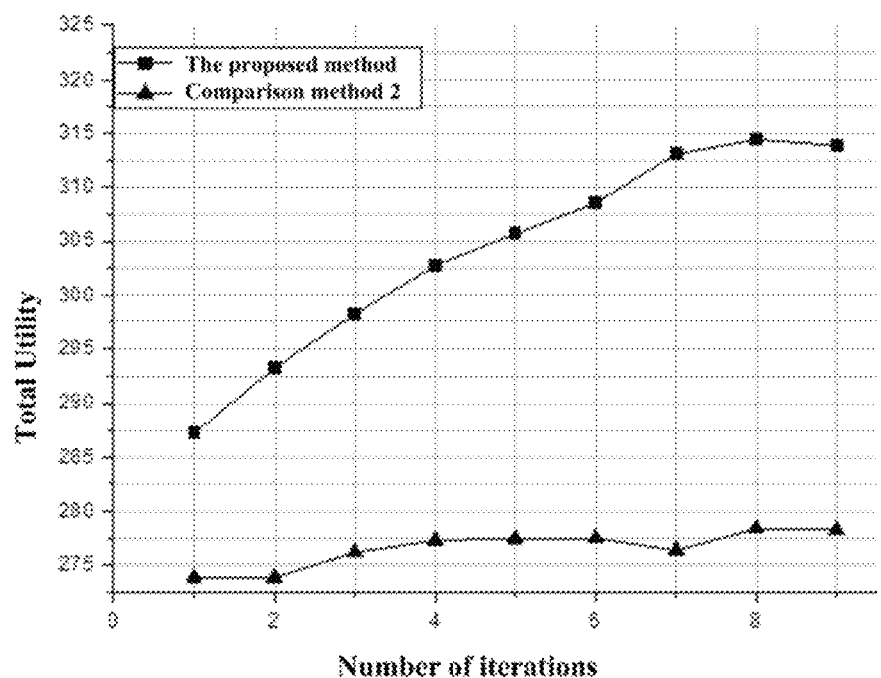
FIG. 16 is a graph showing performance comparison between the method according to the present disclosure and a comparison method 2.

FIG. 16 is a graph showing performance comparison between the method according to the present disclosure and the comparison method 2. It can be seen that within a certain range of the number of iterations of the optimization algorithm, the total spectrum utility obtained with the method according to the present disclosure increases with the increase of the number of iterations, and the total spectrum utility obtained with the method according to the present disclosure is significantly higher than the total spectrum utility of comparison method 2.

Figure 17:
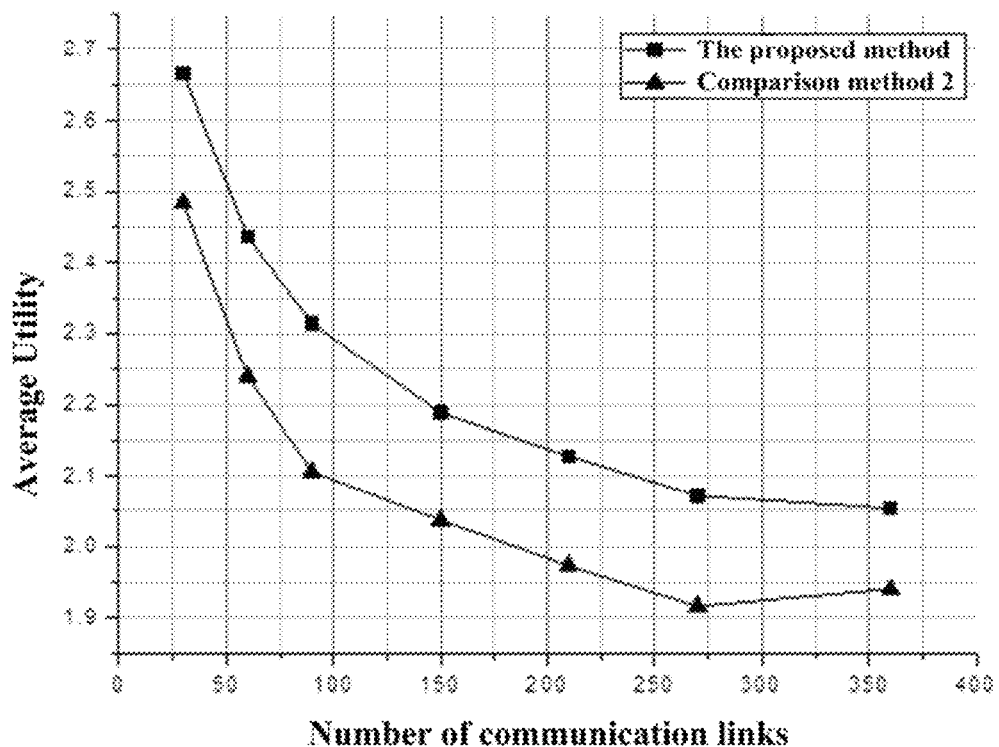
FIG. 17 is another graph showing performance comparison between the method according to the present disclosure and the comparison method 2.

FIG. 17 is another graph showing performance comparison between the method according to the present disclosure and the comparison method 2. The number of iterations of the optimization algorithm is 5. It can be seen that the method according to the present disclosure can obtain a higher average spectrum utility than the comparison method 2, for different numbers of communication links.

It should be noted that the above simulation examples are only for the convenience of understanding, and do not limit the present disclosure.

The technology of the present disclosure may be applied to various products.

For example, the electronic apparatuses 100 and 200 each may be implemented as any type of servers, such as a tower server, a rack server or a blade server. The electronic apparatus 100 may be a control module (such as an integrated circuitry module including a single die, and a card or blade inserted into a slot of a blade server) mounted on a server.

[Application Example Regarding a Server]

Figure 18:
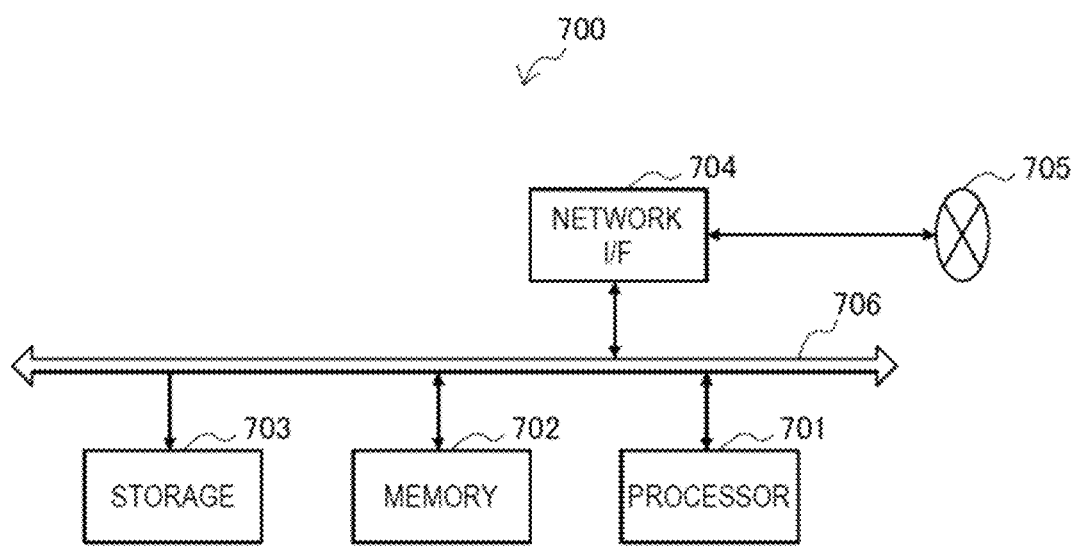
FIG. 18 is a block diagram showing an example of an exemplary configuration of a server to which the technology according to the present disclosure may be applied.

FIG. 18 is a block diagram of an example of an exemplary configuration of a server 700 to which the technology according to the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls the functions of the server 700. The memory 702 includes a random-access memory (RAM) and a read only memory (ROM), and stores data and programs executed by the processor 701. The storage 703 may include a storage medium such as a semiconductor memory and a hard disk.

The network interface 704 is a communication interface for connecting the server 700 to a communication network 705. The communication network 705 may be a core network such as an evolved packet core network (EPC) or a packet data network (PDN) such as the Internet.

The processor 701, the memory 702, the storage 703, and the network interface 704 are connected to each other via a bus 706. The bus 706 may include two or more buses having respective speeds (such as a high speed bus and a low speed bus).

In the server 700 shown in FIG. 18, the first determining unit 101, the second determining unit 102 described with reference to FIG. 2, the transceiving unit 103 described with reference to FIG. 6, and the like may be implemented by the processor 701. For example, the processor 701 may determine the spectrum sharing mode of each UE and the spectrum sharing scheme of each UE by performing the functions of the first determining unit 101, the second determining unit 102, and the transceiving unit 103. The storage unit 201 described with reference to FIG. 7 may be implemented by the memory 702 and/or the storage device 703, and the transceiving unit 202 and the determining unit 203 may be implemented by the processor 701. For example, the processor 701 may determine the parameters required in the determination of the spectrum sharing scheme by performing the functions of the transceiving unit 202 and the determining unit 203.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1900 shown in FIG. 19) from a storage medium or network, wherein the computer is capable of implementing various functions when installed with various programs.

Figure 19:
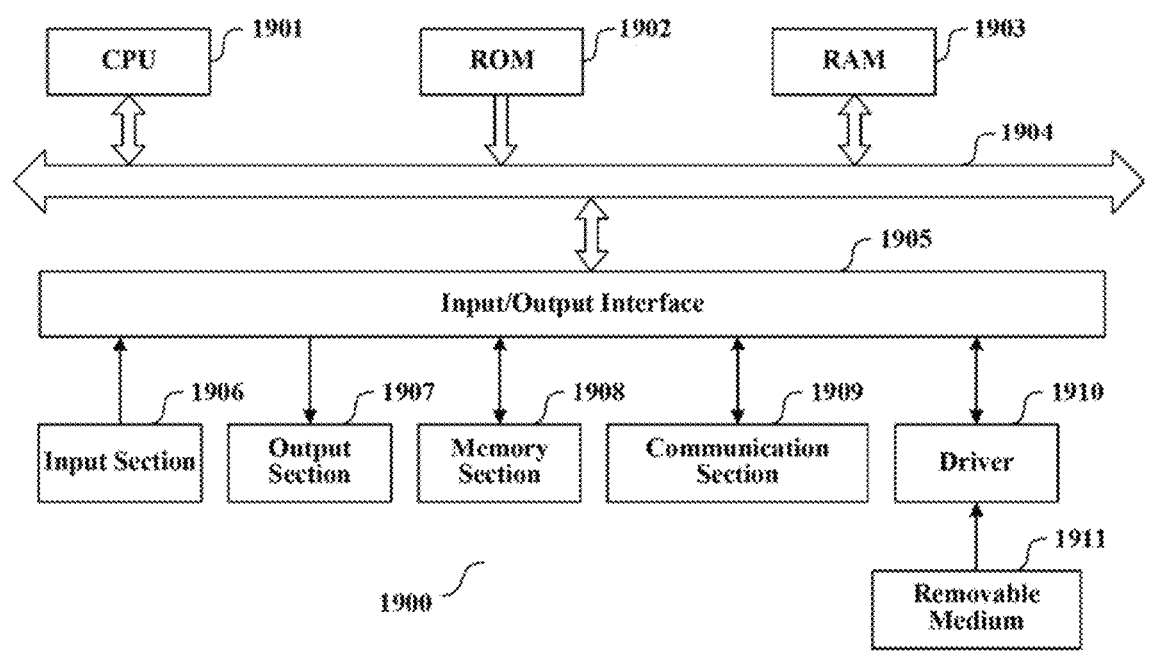
FIG. 19 is a block diagram of an exemplary block diagram illustrating the structure of a general purpose personal computer capable of realizing the method and/or device and/or system according to the embodiments of the present disclosure.

In FIG. 19, a central processing unit (CPU) 1901 executes various processing according to a program stored in a read-only memory (ROM) 1902 or a program loaded to a random access memory (RAM) 1903 from a memory section 1908. The data needed for the various processing of the CPU 1901 may be stored in the RAM 1903 as needed. The CPU 1901, the ROM 1902 and the RAM 1903 are linked with each other via a bus 1904. An input/output interface 1905 is also linked to the bus 1904.

The following components are linked to the input/output interface 1905: an input section 1906 (including keyboard, mouse and the like), an output section 1907 (including displays such as a cathode ray tube (CRT), a liquid crystal display (LCD), a loudspeaker and the like), a memory section 1908 (including hard disc and the like), and a communication section 1909 (including a network interface card such as a LAN card, modem and the like). The communication section 1909 performs communication processing via a network such as the Internet. A driver 1910 may also be linked to the input/output interface 1905, if needed. If needed, a removable medium 1911, for example, a magnetic disc, an optical disc, a magnetic optical disc, a semiconductor memory and the like, may be installed in the driver 1910, so that the computer program read therefrom is installed in the memory section 1908 as appropriate.

In the case where the foregoing series of processing is achieved through software, programs forming the software are installed from a network such as the Internet or a memory medium such as the removable medium 1911.

It should be appreciated by those skilled in the art that the memory medium is not limited to the removable medium 1911 shown in FIG. 19, which has program stored therein and is distributed separately from the apparatus so as to provide the programs to users. The removable medium 1911 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1902 and the memory section 1908 in which programs are stored, and can be distributed to users along with the device in which they are incorporated.

To be further noted, in the apparatus, method and system according to the present disclosure, the respective components or steps can be decomposed and/or recombined. These decompositions and/or re-combinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
processing circuitry, configured to:
determine, based on a service requirement of each of at least one user equipment, a spectrum sharing mode suitable for the user equipment; and
determine, based on the spectrum sharing mode for a respective user equipment, a spectrum sharing scheme for the respective user equipment,
wherein the processing circuitry is further configured to take overall network performance obtained by applying the spectrum sharing scheme as an optimization object when determining the spectrum sharing scheme, and
wherein the overall network performance is represented by a total spectrum utility which is a sum of spectrum unities of all the user equipment, and the spectrum utility of the user equipment indicates a degree of the service requirement of the user equipment being satisfied.

2. The electronic apparatus according to claim 1, wherein the service requirement comprises one or more of the following: a requirement of quality of service or quality of experience, a latency requirement, and a requirement of a data transmission rate.

3. The electronic apparatus according to claim 1, wherein the processing circuitry is configured to:
determine, based on a pre-trained model of correspondence relationship, the spectrum sharing mode for the user equipment, wherein the model of correspondence relationship represents a correspondence relationship between a parameter of the user equipment and the spectrum sharing mode for the user equipment, and the parameter of the user equipment is based on at least the service requirement of the user equipment.

4. The electronic apparatus according to claim 3, wherein the model of correspondence relationship is obtained using a machine learning algorithm, wherein the machine learning algorithm comprises a multi-class supervised learning algorithm, and the multi-class supervised learning algorithm comprises one of a random forest algorithm, a K-neighbor algorithm, and a naive Bayes algorithm.

5. The electronic apparatus according to claim 1, wherein the spectrum sharing mode comprises: a low-latency service requirement mode, a high data transmission rate requirement mode, and a general data service requirement mode.

6. The electronic apparatus according to claim 1, wherein the spectrum utility of the user equipment is a weighted function of a function of spectrum satisfying degree of the user equipment, a function of a normalized latency, a function of normalized quality of service or quality of experience, wherein the normalized latency is a normalized result of a latency of the user equipment with respect to a latency threshold corresponding to the spectrum sharing mode for the user equipment, the normalized quality of service or quality of experience is a normalized result of quality of service or quality of experience of the user equipment with respect to a threshold of quality of service or quality of experience corresponding to the spectrum sharing mode for the user equipment, and a weight for each item represents a degree of importance of the item.

7. The electronic apparatus according to claim 6, wherein the quality of service or quality of experience is represented by a Signal to Interference plus Noise Ratio.

8. The electronic apparatus according to claim 1, wherein the processing circuitry is configured to determine the spectrum sharing scheme using an ant colony optimization algorithm supporting multi-mode, wherein an optimization process of the ant colony optimization algorithm supporting multi-mode is related to the spectrum sharing mode, in the ant colony optimization algorithm supporting multi-mode, a pheromone increment represents a degree of satisfying at least a part of service requirement of the user equipment when applying the current spectrum sharing scheme.

9. The electronic apparatus according to claim 8, wherein the at least a part of service requirement comprises requirement of quality of service or quality of experience and requirement of data transmission rate.

10. The electronic apparatus according to claim 8, wherein, in the ant colony optimization algorithm supporting multi-mode, heuristic information for the user equipment is determined based on the requirement of data transmission rate of the user equipment and a priority level of the spectrum sharing mode of the user equipment.

11. The electronic apparatus according to claim 8, wherein the processing circuitry is configured to:
randomly select a plurality of nodes in an interference overlay map as starting nodes, wherein the interference overlay map is constructed based on relevant information of respective user equipment, and each node in the interference overlay map represents one user equipment or one group of user equipment, and an edge between two nodes indicates that there is an interference relationship between the two nodes;
for each of the plurality of starting nodes, traverse all nodes in the interference overlap graph from the starting node and allocating spectrum resources to each node in the order of traversal to obtain a spectrum sharing scheme corresponding to a path starting from the starting node, wherein in a traversal process, a next node to be moved to is determined based on accumulated pheromone and heuristic information for nodes not passed;
calculate, based on the spectrum sharing scheme, a pheromone increment determined by the path and accumulate the pheromone increment to the accumulated pheromone to obtain an updated accumulated pheromone, and calculate the total spectrum utility of the spectrum sharing scheme, wherein the updated accumulated pheromone is used for a traversal process starting from a next starting node; and
select, from among spectrum sharing schemes corresponding to paths starting from each of the starting nodes, a spectrum sharing scheme with the highest total spectrum utility,
wherein, the processing circuitry is further configured to determine, from among a plurality of spectrum sharing schemes obtained through a plurality of iterations, a spectrum sharing scheme with the highest total spectrum utility as a finally determined spectrum sharing scheme.

12. The electronic apparatus according to claim 1, wherein the processing circuitry is further configured to acquire one or more of the following: information on the service requirement of the user equipment, information on a location of the user equipment, and information on emitting power of the user equipment.

13. The electronic apparatus according to claim 12, wherein the processing circuitry is configured to acquire the information from an environmental database.

14. The electronic apparatus according to claim 13, wherein the processing circuitry is further configured to acquire relevant parameters required for determining the spectrum sharing scheme from the environmental database.

15. The electronic apparatus according to claim 14, wherein the relevant parameters comprise a plurality of sets of parameters corresponding to spectrum sharing modes, respectively.

16. The electronic apparatus according to claim 1, wherein the spectrum sharing mode of the user equipment is indicated by network slice assistance information.

17. The electronic apparatus according to claim 1, wherein the processing circuitry is further configured to allocate the spectrum resources to the respective user equipment based on the determined spectrum sharing scheme, and optimize the determination of the spectrum sharing scheme based on the spectrum utility obtained by the respective user equipment based on the spectrum resources.

18. A method for wireless communications, the method comprising:
determining, based on a service requirement of each of at least one user equipment, a spectrum sharing mode suitable for the user equipment; and
determining, based on the spectrum sharing mode for a respective user equipment, a spectrum sharing scheme for the respective user equipment,
wherein the method further comprises taking overall network performance obtained by applying the spectrum sharing scheme as an optimization object when determining the spectrum sharing scheme, and
wherein the overall network performance is represented by a total spectrum utility which is a sum of spectrum unities of all the user equipment, and the spectrum utility of the user equipment indicates a degree of the service requirement of the user equipment being satisfied.

19. A non-transitory computer readable storage medium having computer-executable instructions stored thereon, which when executed, cause the method for wireless communications according to claim 18 to be performed.

* * * * *